United States Patent [19]

Huynh-Ba et al.

[11] Patent Number: 4,668,742
[45] Date of Patent: May 26, 1987

[54] POLYMERS OF N,N-DISUBSTITUTED ACRYLAMIDES AND METHOD FOR THE PREPARATION THEREOF

[75] Inventors: Gia Huynh-Ba, Wilmington, Del.; James E. McGrath, Blacksburg, Va.

[73] Assignee: The Dow Chemical Company, Midland, Mich.

[21] Appl. No.: 353,788

[22] Filed: Mar. 1, 1982

[51] Int. Cl.[4] .......................................... C08F 297/02
[52] U.S. Cl. ................... 525/294; 525/256; 526/204
[58] Field of Search ............. 525/294, 314, 256; 526/204

[56] References Cited

U.S. PATENT DOCUMENTS

| | | | |
|---|---|---|---|
| 3,144,429 | 8/1964 | Strobel | 525/294 |
| 3,458,598 | 7/1969 | Craven | 525/256 |
| 3,567,798 | 3/1971 | Haefele et al. | 525/314 |
| 3,607,977 | 9/1971 | Taylor et al. | 525/294 |
| 4,085,168 | 4/1978 | Milkovich et al. | 525/294 |
| 4,337,327 | 1/1982 | Stoy | 525/294 |

*Primary Examiner*—Paul R. Michl

[57] ABSTRACT

N,N-disubstituted acrylamides are polymerized at temperatures from about −80° to 100° centigrade by anionically initiated polymerization to provide homogeneous polymerization by employing a solvent containing from about 25 to 100 weight percent of a pyridine type compound. Homopolymers or block polymers may be obtained.

2 Claims, No Drawings

POLYMERS OF N,N-DISUBSTITUTED ACRYLAMIDES AND METHOD FOR THE PREPARATION THEREOF

This invention relates to polymers of N,N-disubstituted acrylamides. Polymers and copolymers of N,N-disubstituted acrylamides have been known in the art. U.S. Pat. No. 2,914,498 discloses latex copolymers of vinyl chloride which have been thickened by the use of water-soluble polymers of N,N-dialkylacrylamides. Polymer alloys have been prepared of a vinyl chloride polymer and ethylene dialkylacrylamide copolymers, and are disclosed in U.S. Pat. No. 3,798,289. British patent No. 855,741 discloses a polymerization of N-alkyl and N,N-dialkyl as well as N,N-alkylcycloalkylacrylamide derivatives in a hydrocarbon solvent employing an organolithium initiator. British patent No. 883,494 discloses the polymerization of N,N-disubstituted acrylamides with various monomers in hydrocarbon solvents or inert ethers using hydrides or organo-metallic compounds of Group 1A of the Periodic Table. The Journal of Polymer Science, Volume XLVIII, pages 357–366, 1960 in a paper by Butler, Thomas and Tyler, discloses the stereospecific polymerization of some polar vinyl monomers and discusses the anionic polymerization of some N,N-disubstituted acrylamides in various solvents and the physical properties of polymers obtained therefrom. Chemical Abstracts, Volume 70 1969, 29560p discloses that an ethylene N,N-dibutylacrylamide copolymer is obtained by polymerization in hexane using titanium tetrachloride n-butyllithium combination as an initiator. An Alcolac Inc. brochure dated May 1975 entitled SIPOMER NNDMA discloses the polymerization of N,N-dimethylacrylamide by free radical, anionic and cationic initiators. The brochure cites numerous references to the polymerization and end use applications of polymers of N,N-dimethylacrylamide. The known cited art fails to provide any reasonable teaching which would lead one to the preparation of desirable block copolymers of N,N-disubstituted acrylamides with other monomers such as styrene. The relied upon art fails to provide a reasonable suggestion of or a route to a clean, readily reproducible homogeneous polymerization technique which would provide desirable block copolymers of a N,N-disubstituted acrylamide with an anionically polymerizable monomer block.

These benefits and other advantages of the present invention are achieved in a block copolymer, the block copolymer being of the configuration AB or ABA, the block A being a polymer of a monomer of the general formula:

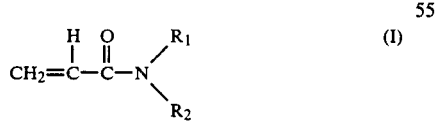

wherein $R_1$ and $R_2$ are individually selected from the group consisting of alkyl radicals, cycloalkyl and alkyl substituted cycloalkyl radicals, aromatic, alkylaromatic and arylalkyl radicals with the further limitation that each of said radicals contains from 1 to 10 carbon atoms and is monovalent, and B is a block of an anionically polymerizable monomer composition wherein a proportion of A to B by weight is from 1:99 to 99:1 and the weight average molecular weight of the block copolymer is from about 500 to about 50 million.

Also contemplated within the scope of the present invention is a method for the preparation of a polymer of a monomer of the Formula I:

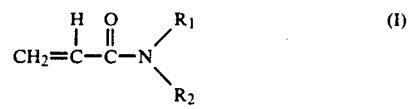

the steps of the method comprising disposing at least one monomer in accordance with Formula I in a solvent and anionically initiating polymerization thereof and subsequently recovering a polymer having polymerized therein a monomer of Formula I, the improvement which comprises utilizing a solvent which is generally inert under the conditions of polymerization wherein said solvent contains from about 5 to 100 weight percent based on the total weight of solvent of a compound of the Formula I, initiating homogeneous polymerization in the presence of a nitrogen containing heterocyclic compound and obtain a polymer of a monomer of the Formula I. Generally, it is desirable that the hetrocyclic compound be present in an amount of at least 5 weight percent of the weight of the monomer of Formula I.

Compounds of Formula I suitable for the practice of the present invention include such material as N,N-dimethylacrylamide, N,N-diethylacrylamide, N,N-dipropylacrylamide, N,N-diisopropylacrylamide, N,N-dicyclohexylacrylamide, N,N-diphenylacrylamide, mixed hydrocarbyl N,N-disubstituted acrylamides and the like. Anionically polymerizable monomers suitable for the preparation of B block in the block copolymers in accordance with the present invention include vinyl aromatic monomers such as styrene, vinyl toluene (any isomer); tertiary-butylstyrene (any isomer); methacrylate monomers including methylmethacrylate, ethylmethacrylate, 2-ethylhexylmethacrylate, 2-methylhexylmethacrylate and the like. Other monomers include 1,3-butadiene, isoprene and the like. The proportion of monomers A to B by weight may be from 1:99 to 99:1 depending upon the end use desired.

Nitrogen containing heterocyclic aromatic compounds, which are useful in the practice of the present invention are:

Pyridine 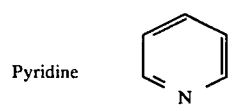

3,5-dimethylpyridine 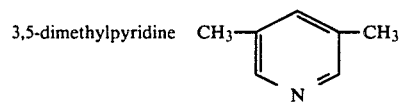

and quinoline 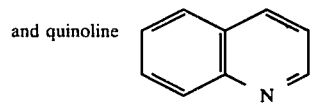

Suitable solvents for polymerization of polymers in accordance with the present invention are aprotic compounds which are generally nonreactive under the conditions of polymerization and include benzene, toluene, xylene; and ethers, such as tetrahydrofuran, dioxane, dibutylether, diethylether and the like. Particularly advantageous are nitrogen containing heterocyclic compounds which include pyridine, 3,5-dimethypyridine, quinoline and the like. Suitable initiators for the anionic polymerization of polymers in accordance with the present invention include organolithium compounds such as butyllithium, secondary butyllithium, sodium alphamethylstyrene dimer and other organo metallic compounds of group 1A of the Periodic Table, as well as organomagnesium compounds. The temperature of polymerization generally for the blocks containing monomers for Formula I is from about $-80°$ to $100°$ centigrade. The selection of the particular temperature range employed will depend upon the reactivity of the particular compound or mixture of compounds of Formula I and whether or not a monomer copolymerizable with the compounds of Formula I is employed.

In the following examples pyridine was purified by distilling over secondary butyllithium. Monomers were purified by distilling over calcium hydride. Solvents benzene, toluene and hexane were distilled over calcium hydride and subsequently distilled over stearyl lithium. Tetrahydrofuran was distilled over stearyl lithium. Tetrahydrofuran was distilled over calcium hydride and subsequently distilled over a benzophenone sodium complex. Polymers were dried overnight about 16 hours at 60° centigrade in a vacuum oven.

EXAMPLE 1

Polymerization was conducted employing a 500 milliliter flask fitted with a magnetic stirrer, a thermometer and nitrogen purge. The reaction flask was charged with 100 grams of benzene, 6.2 grams of styrene while under nitrogen purge. The temperature of the reaction mixture was maintained at 0° centigrade. To initiate polymerization of the styrene, $0.9 \times 10^{-3}$ moles of secondary butyllithium dissolved in hexane were added to the reaction mixture. After a period of 20 hours, the temperature of the reaction mixture was lowered to $-50°$ centigrade and 250 grams of pyridine were added, together with 6.8 grams of N,N-dimethylacrylamide. Ten minutes after the addition of the N,N-dimethylacrylamide, methanol was added to terminate the living polymer. Polymer was recovered by precipitating in methanol and filtering. Block copolymer formed was subsequently separated from polystyrene. The yield of copolymer was 9.1 grams. The block copolymer obtained contained 75 weight percent N,N-dimethylacrylamide. The block copolymer had an intrinsic viscosity of 0.50 at 20° centigrade in dichloromethane. The intrinsic viscosity of the polystyrene formed was 0.08.

EXAMPLE 2

The apparatus of Example 1 was employed to prepare a block copolymer of isoprene and N,N-dimethylacrylamide. The flask was charged with 100 grams of toluene, 6.8 grams of isoprene and the contents of the flask maintained at a temperature of about 0° centigrade. To initiate polymerization of the isoprene, $3.9 \times 10^{-3}$ moles of secondary butyllithium dissolved in hexane were added to the reaction mixture. The reaction mixture was maintained at 0° centigrade for a period of 20 hours. At the end of the 20 hour period, 250 grams of pyridine were added and the contents of the reaction vessel cooled to a temperature of $-50°$ centigrade. 10.6 Grams of N,N-dimethylacrylamide were added to the reaction mixture with agitation. 10 Minutes after the addition of N,N-dimethylacrylamide, the initiator was inactivated by the addition of methanol to the reaction mixture. Toluene and pyridine were removed from the reaction mixture by vacuum distillation and the residual polymer was dissolved in benzene. Benzene was subsequently removed by vacuum distillation. The polymer was again dissolved in benzene and the benzene evaporated for a total of three solutions and evaporations. The remaining polymer was dissolved in benzene and freeze dried. The yield of polymer was 16.2 grams. The block copolymer contained 58 weight percent N,N-dimethylacrylamide units. The inherent viscosity of the block copolymer in dichloromethane at 25° centigrade was 0.14. The polymer was soluble in methanol but provided a somewhat turbid solution when dissolved in hexane.

EXAMPLE 3

A block copolymer of styrene with N,N-dibutylacrylamide was prepared generally in the manner of Example 1, the reaction vessel was charged with 100 milliliters of toluene, 5.44 grams of styrene, and the temperature of the reaction mixture maintained at 0° centigrade. $1.2 \times 10^{-3}$ Moles of secondary butyllithium were added to initiate polymerization. The reaction mixture was maintained at 0° centigrade overnight. 30 Milliliters of pyridine were added to the reaction mixture whereupon the color of the solution turned from orange to yellow. The reaction mixture was cooled to $-55°$ centigrade whereupon 6.4 grams of N,N-dibutylacrylamide admixed with a benzil sodium complex as a drying agent were added to the reactor. After the addition of the N,N-dibutylacrylamide was made at $-55°$ centigrade over a period of 20 minutes, the temperature of the reaction mixture was raised to 0° centigrade and was held at that temperature for a period of 25 minutes. The apparent viscosity of the reaction mixture increased. The polymer was recovered by precipitation in methanol. The yield of polymer was 11.74 grams in the form of a white powder. The white powder was extracted with hexane to yield 10 grams of block copolymer containing 64 weight percent N,N-dibutylacrylamide and 36 weight percent styrene polymerized therein. The intrinsic viscosity of the polymer in toluene at 30° centigrade was 0.39 deciliters per gram.

EXAMPLE 4

A block copolymer of styrene and N-methyl, N-phenylacrylamide was prepared generally in the manner of Example 1 wherein the reaction vessel was charged with 100 milliliters of toluene, 5.64 grams of styrene, together with $1.2 \times 10^{-3}$ moles of secondary butyllithium. The reaction mixture was maintained at 0° centigrade overnight and a 10 milliliter aliquot was withdrawn and coagulated in methanol to provide polymer having an intrinsic viscosity in trichloromethane at 30° centigrade of 0.04 deciliters per gram. 32 Milliliters of pyridine were added to the reaction mixture and the reaction mixture cooled to $-55°$ centigrade. A solution of 7 grams of N-methyl,N-phenyl acrylamide in 16 milliliters of benzene with some benzil sodium complex as drying agent were added to the reaction mixture, which was stirred for a period of twenty-five minutes after the addition whereupon the reaction was terminated by the addition of methanol. The polymer was recovered from the reaction mixture by precipitation in hexane. The yield of crude polymer was 10.68 grams.

The crude polymer was fractionated in a cyclohexane toluene mixture to yield 10.22 grams of fractionated polymer which was 70 weight percent of the N-methyl,N-phenyl acrylamide and 30 weight percent styrene. The polymer had an intrinsic viscosity in chloroform at 30° centigrade of 0.117 deciliters per gram.

EXAMPLE 5

A tri-block copolymer of N,N-dibutylacrylamide with 2-ethylhexylmethacrylate was prepared employing the general procedure of Example 1. The reaction vessel was charged with 70 milliliters of tetrahydrofuran together with $2.5 \times 10^{-4}$ moles of sodium naphthalene complex plus $10^{-5}$ moles of sodium benzil. The reaction mixture was maintained at a temperature of $-80°$ centigrade. 7 Milliliters of 2-ethylhexylmethacrylate dissolved in 9 milliliters of tetrahydrofuran were added dropwise over a period of about 15 minutes. A 10 milliliter aliquot was taken and polymer recovered therefrom by coagulation in methanol. The polymer had an intrinsic viscosity in tetrahydrofuran at 25° centigrade of 0.116 deciliters per gram. A solution of 4 milliliters of N,N-dibutylacrylamide in toluene containing 1.5 grams of N,N-dibutylacrylamide was added to the reaction mixture over a period of about 5 minutes. The reaction was terminated by the addition of methanol and the polymer recovered by precipitation in methanol. 7.25 Grams of polymer were recovered. The resultant polymer was rubber-like and had a composition of 10-80-10 and a structure ABA wherein the A blocks are poly(N,N-dibutylacrylamide) and the B block is poly(2-ethylhexylmethacrylate). The intrinsic viscosity of the polymer in a tetrahydrofuran solution at 25° centigrade was 0.17 deciliters per gram.

In a manner similar to the foregoing illustrations, a wide variety of other block copolymers containing blocks of N,N-disubstituted acrylamides are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A block copolymer, the block copolymer being of the configuration AB or ABA, the block A being a polymer of N-methyl, N-phenyl acrylamide and B is a block of an anionically polymerizable monomer composition wherein the proportion of A to B by weight is from 1:99 to 99:1 and the weight average molecular weight of the block copolymer is from about 500 to 50 million.

2. A block copolymer, the block copolymer being of the configuration AB or ABA, the block A being a polymer of a monomer of the general formula:

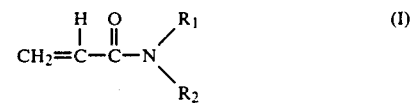

wherein $R_1$ and $R_2$ are individually selected from the group consisting of alkyl radicals, cycloalkyl and alkyl substituted cycloalkyl radicals, aromatic, alkylaromatic and arylalkyl radicals with the further limitation that each of said radicals contains from 1 to 10 carbon atoms and is monovalent, and B is a block of a polymerized 2-ethylhexyl methacrylate composition wherein a proportion of A to B by weight is from 1:99 to 99:1 and the weight average molecular weight of the block copolymer is from about 500 to about 50 million.

* * * * *